May 7, 1946.   J. C. TEMPLE   2,399,953
METHOD OF MAKING CHAIN LINKS
Filed Aug. 10, 1943
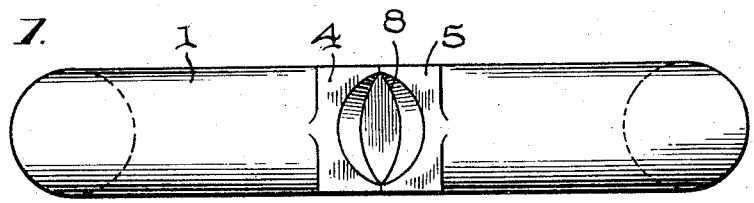
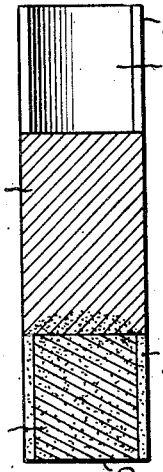
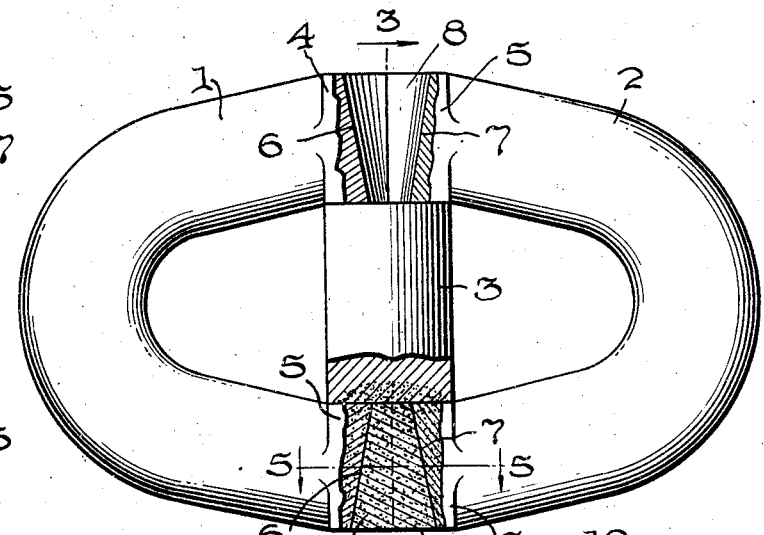
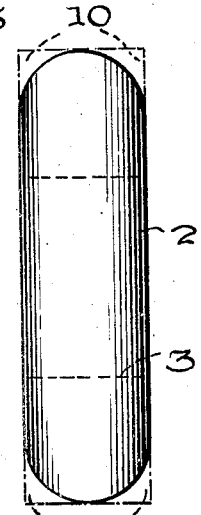
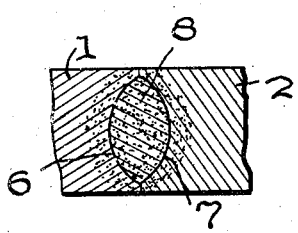
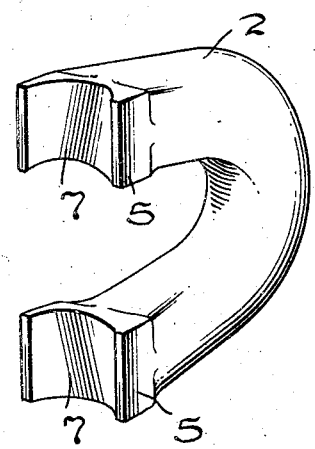
Inventor
John C. Temple
By Robt H Cobb
Attorneys Patented May 7, 1946

2,399,953

REISSUED

UNITED STATES PATENT OFFICE 2,399,953

METHOD OF MAKING CHAIN LINKS

John C. Temple, Sarasota, Fla.

Application August 10, 1943, Serial No. 498,102

2 Claims. (Cl. 59—35)

This invention relates to chain links of the stud link type, and more epsecially, to an improved chain link for anchor chains and chain cables, and to the method of making the same.

Prior to the year 1924, wrought iron chain was the standard type in all naval vessels for making up anchor cables. In 1924, cast steel chain was adopted as the standard to replace wrought iron chain in all sizes. Still later, there was developed a type of chain known as "Di-Lok" which was adopted as the standard for naval ships because of its outstanding feature of uniformity of strength. While cast steel chain is generally satisfactory in this respect, this type of chain may vary in strength due to different degrees of casting perfection. The links of die-locked chain are composed of male and female sections, the male section of which is heat treated, quenched, and tempered before assembly, whereas the female section must be heated to a forging temperature for assembly. Accordingly, any subsequent heat treatment of the assembled link might adversely affect the hardness of the reduced stems and collars of the male section. This accounts for the fact that properly manufactured die-locked chain usually breaks through its solid section in the female half of the link.

The studs of cast steel and die-locked chain are integral parts of the link instead of being welded in as they are in the case of wrought iron chain, but the studs of die-locked chain are split in the middle because of the way the links are manufactured and assembled.

The present invention comes about as the result of further development of the construction and method of making chain links, and preserves the important advantages of both the die-locked and cast steel types, but eliminates the inherent disadvantages or weaknesses of these types of chains. That is to say, my improved chain link is characterized by its great strength which can be uniformly attained in each link of a chain or chain cable, together with the provision of a solid stud which is essentially an integral part of the link.

In carrying out my new method of making chain links, I preferably form the link in three parts, two of which are substantially alike and comprise half-link sections. The third part comprises a stud piece which forms a solid stud.

In forming the half-link sections, I preferably employ round bar stock of any suitable metal having the required tensile strength and other desired characteristics. The bar stock is cut into predetermined lengths which are then bent, either while hot or cold as desired, into a substantially U-shaped form, corresponding to the shape of a half-link. The free ends of the half-links are preferably upset and squared, either before or after bending, and simultaneously with or subsequent to the upsetting operation, a cavity or recess is formed in each extreme end of the arms of each half-link. Thereupon, two of said half-link sections are placed in opposed relation to each other, with the ends of the respective arms abutting on the minor axis of the composite link. When so positioned, the cavities in the opposed arms form a crater or crucible therebetween, at each side of the link, with each crater extending completely through the adjoining arms from the outside to the inside thereof. A stud piece is next positioned between the opposite sides of the link, with the stud piece extending transversely thereacross and abutting against the inside of the adjoining arms of the half-link sections. This stud piece may be composed of the same material as the half-link sections, or otherwise as desired, and the opposite ends of the stud piece are preferably made flat so as to closely fit against the opposite sides of the link in the assembly thereof. Thus, when the stud piece is in place, its opposite ends close the bottom of the respective craters or crucibles at the opposite sides of the links, previously referred to.

The component parts of the link are preferably assembled in a suitable fixture or jig to maintain the relative assembled arrangement of the parts as above described. Thereafter, the link may be handled as desired for the purpose of integrally bonding the parts together, in the manner of what is currently known as a "union melt" electric resistance weld, or as by a thermite weld, or in some other suitable manner.

In performing the bonding or welding operation, the pre-assembled link is preferably positioned in a vertical plane, and a suitable fusible material is deposited in the uppermost crater or crucible formed at the juncture of the arms of the half-link sections. Heat is then applied to the fusible material, as by means of an electric arc or otherwise, thereby causing the material to fuse and integrally bond the abutting arms of the half-link sections together, and simultaneously bond these arms with the abutting end of the stud piece. By repeating the welding operation above described to join the arms of the half-link sections and the stud at the opposite side of the link, the composite link becomes an integral structure of uniformly great strength throughout, including the stud.

Upon completion of the bonding operations, the outer surfaces of the bonded or welded joints may be rounded off by grinding, forging, pressing, machining, or otherwise, as desired, to eliminate any square corners or rough edges so that the finished link will operate smoothly over the wildcat in the case of an anchor chain, and will otherwise have the finished appearance and form of conventional stud links.

It is to be understood that the term "thermite" as used above and in the following description and claims, is intended to be taken in its broader sense as embracing any of the various mixtures of powdered or finely-divided metal (as calcium or magnesium) or metallic alloy with a metallic compound or oxide, having similar properties, and which on being heated by a priming, combines violently with the oxygen of the oxide, setting free the metal, producing a fluid slag, and generating great heat. Temperatures on the order of 5400° F. may be obtained from the ignition of a mixture of finely-divided iron oxide and aluminum, and will produce fused iron which will melt any iron or steel with which it comes in contact. Instead of using fusible material of the character employed in thermite welds, the material may be of the type employed in "union melt" electric resistance welds, wherein the fusible material and flux is brought up to the fusing temperature by means of an electrical resistance such as produced by the immersion of an electrode within fusible material and applying a high current thereto. While the specific ingredients of the fusible material referred to above are not to be taken as limiting my invention thereto, these illustrations will serve to clarify the principle of my invention, by which the component parts of links, such as anchor chain links, may be expeditiously and economically assembled and joined together in the form of chain or chain cable which is fully capable of fulfilling the currently prescribed requisites for such chain.

Other and further objects and advantages of the invention will be hereinafter set forth and the novel features thereof defined by the appended claims.

In the drawing:

Figure 1 is a view in side elevation of a typical anchor chain common link constructed in accordance with my invention;

Figure 2 is a plan view of the link, with portions of the half-link sections broken away and showing the crater or crucible in one side of the link preliminary to fusing the ends of the half-link sections and the stud piece together, and also showing the ends of the half-link sections and the stud piece fused together at the opposite side of the link;

Figure 3 is a transverse sectional view taken on the line 3—3 of Figure 2;

Figure 4 is a perspective view of one of the half-link sections, and showing the substantially U-shaped form of the same, with the ends of the link section upset and pre-shaped to provide recesses in the extreme ends, which recesses define the crater or crucible in the opposite sides of the link when two half-link sections are disposed in opposed abutting relation to each other;

Figure 5 is a sectional view taken on the line 5—5 of Figure 2; and

Figure 6 is a view in end elevation of a finished link, with the broken lines representing the material at the center joints of the link which is removed or otherwise shaped upon completion of the welding of the link parts together.

Like reference characters designate corresponding parts in the several figures of the drawing, wherein it will be seen that my new link comprises three component parts respectively designated 1, 2 and 3. The parts 1 and 2 each preferably have the form of half-link sections which are substantially identical with each other, and which may be suitably cast or otherwise formed from predetermined lengths of forged steel round bar stock or other suitable material. In making common links of the conventional type, from bar stock or blanks from which the half-link sections are formed, the blanks are bent into an approximately U-shaped form, either with or without heating the blanks, as desired, and the opposite ends of each half-link section are preferably upset or otherwise enlarged, as indicated at 4, 4 and 5, 5 respectively. Simultaneously with the casting or upsetting operation, or subsequent thereto, the extreme ends of each half-link section are suitably formed to provide an inwardly tapered recess or pocket as indicated at 6, 6 and 7, 7 respectively, each recess extending completely from the outside to the inside of the respective arms of the half-link sections. Thus, when two half-link sections are brought together in opposed abutting relation to each other, the recesses or pockets in the extreme ends of the abutting arms define the walls of a crater or crucible at each side of the link, as indicated at 8, 8, the crater being initially open from end to end and extending through the joint between the half-link sections from outside to inside.

The part designated 3 has the form of a stud piece which may be composed of the same material as the half-link sections, or otherwise, as preferred, and the length of this stud piece is such that it is adapted to be snugly fitted in the space between the opposite sides of the link, as will be best understood from reference to Figures 2 and 3. While the stud piece is preferably round in cross section to correspond with the cross section of the half-link parts, the opposite ends of the stud piece are flat so that on insertion of the stud piece between the opposite sides of the link, in the assembly of the link, the flat ends of the stud piece will completely close the inner ends of the respective craters or crucibles 8, 8. Thereafter, a suitable fusible material, preferably in powdered form, indicated at 9, is deposited in the craters or crucibles 8, 8 so that on ignition of the fusible material in the case of a thermite weld, or melting of the fusible material by electric resistance in the case of a "union melt", the fusible material will become molten, accompanied by the generation of a temperature which is sufficient to cause the fusible material to melt, which in turn melts the metal of the half-link sections and the stud piece surrounding the crucible, for a substantial depth. In this manner, the component parts of the link are firmly fused and bonded together into an integral structure, it being the inherent characteristic of the fusible material above referred to, on being fused, to melt the surrounding metal, for a substantial distance, with which it is in contact, as best illustrated in Figures 2 and 5 of the drawing.

After completion of the bonding or welding operation, the link as a whole may be heat treated if desired, or only those portions of the link adjacent to the joints may be suitably treated to normalize the metal and thus eliminate any strains or stresses which may have been set up in the link by the welding operations.

While I have illustrated and described the making of what is known as "common" links, it will be understood that the form of the link may be varied to suit different conditions of use and to correspond with the different shapes of links customarily employed as connecting links or as end links for joining a chain to the shackle of an anchor. In making up chains and chain cables composed of common links, the links may be successively joined together as each new link is assembled, previous to the welding of the added link. It is further contemplated that disassembled link parts of the form hereinabove described may be carried on shipboard for use as repair links, or connecting links, in which event the welding operations may be readily performed on shipboard without the aid of extensive equipment other than is normally carried on board ship.

Upon completion of the welding operations, the exterior surfaces of the links may be finished off at the joints to remove the excess material which is provided by the upsetting of the abutting ends of the half-link sections, and which is necessary for the retention of the fusible material in the crucible-like cavities in the opposite sides of the links during the fusing or welding operations. This excess material is indicated at 10 in Figure 6 of the drawing, and may be removed in any suitable manner as by grinding, machining, compressing or the like, so that, in its finished form, the links will have the smooth or finished appearance of conventional links, without any sharp corners or rough edges.

It will be understood from the foregoing that in its broad aspect, my invention embodies a novel method of making a joint between two or more parts, wherein the parts are arranged in abutting relation to each other so as to define relatively closely confining side walls of an internal crucible-like cavity extending completely through the joint, then closing one side of the crucible-like cavity to form a bottom retaining wall, thereafter depositing a fusible material in the crucible-like cavity, and fusing the same to form an integral joint between the parts. The closing of the bottom of the crucible-like cavity may be performed either by a separate part arranged in abutting relation to the first two parts so that on fusing the fusible material, the closure part will become a part of the joint which will then have the form of a T, or the closure member may otherwise be separate and distinct from the parts to be joined, and which can be removed after completion of the welding together of the two parts. The method is especially adaptable to the manufacture of chain links of the stud link type, wherein one end of the stud piece is utilized to close the bottom of the crucible-like cavity formed between the abutting ends of two half-link sections, so that the end of the stud becomes simultaneously united with the half-link sections at the joint between the abutting parts of the half-link sections.

While the specific details of construction have been herein shown and described, the invention is not confined thereto as changes and alterations may be made without departing from the spirit thereof as defined by the appended claims.

I claim:

1. The method of making chain links of the stud link type, which comprises arranging a pair of half-link sections with their ends substantially abutting in surface contact along the minor axis of the link, and forming between the abutting ends aforesaid an open-ended crucible-like cavity extending completely through each side of the link from outside to inside, interposing between the opposite sides of the link a separate stud piece, with its opposite ends arranged to substantially close the inner ends of the respective crucible-like cavities, and depositing a fusible material in said crucible-like cavities and fusing the same to integrally bond the half-link sections and the stud piece together.

2. The method of making chain links of the stud link type, which comprises forming two half-link sections and shaping the free ends of the arms of each half-link section to provide a recess therein extending from the outside of the arm to the inside of the arm, placing the half-link sections in juxtaposition with the respective arms in abutting engagement along the minor axis of the link, and with the side walls of the recesses in the respective arms forming a crucible-like cavity in each side of the link which extends completely through the sides of the link on the minor axis thereof, interposing between the opposite sides of the link a separate stud piece with its opposite ends arranged to substantially close the inner ends of the respective crucible-like cavities, and depositing a fusible material in said crucible-like cavities and fusing the same to integrally bond the half-link sections and the stud piece together.

JOHN C. TEMPLE.